United States Patent [19]

Pickios

[11] 4,450,615
[45] May 29, 1984

[54] METHOD OF FABRICATING A HAND CALCULATOR

[76] Inventor: Anthony G. Pickios, 16 Penn Dr., Dix Hills, N.Y. 11746

[21] Appl. No.: 385,555

[22] Filed: Jun. 7, 1982

[51] Int. Cl.$^3$ ............................................. B23P 11/00
[52] U.S. Cl. ........................................ 29/437; 29/446; 29/458; 29/521; 29/526 R; 72/327; 72/347; 156/629; 235/74; 235/78 R; 235/88 R; 403/162; 403/274; 403/376; 427/421
[58] Field of Search ...................... 235/74, 78 R, 88 R; 427/421; 156/629, 633, 634; 403/162, 274, 376, 379; 72/83, 327, 347, 348; 29/437, 446, 458, 526 R, 521

[56] References Cited

U.S. PATENT DOCUMENTS

| | | | |
|---|---|---|---|
| 1,285,941 | 11/1918 | Church | 235/88 R |
| 1,382,331 | 6/1921 | Thomas | 235/74 |
| 1,433,123 | 10/1922 | Corey | 29/437 |
| 1,900,960 | 3/1933 | Takeda | 156/634 |
| 2,013,640 | 9/1935 | Steinhart et al. | 427/421 |
| 2,103,424 | 12/1937 | Lehman | 29/437 X |
| 3,191,564 | 6/1965 | Fraze | 29/512 |
| 3,277,541 | 10/1966 | Wilton et al. | 156/634 X |
| 4,092,521 | 5/1978 | Weisshaar | 235/88 RC |
| 4,150,472 | 4/1979 | Derain | 29/458 |
| 4,366,696 | 1/1983 | Durgin et al. | 72/348 X |

FOREIGN PATENT DOCUMENTS 0649488  1/1951  United Kingdom ............ 235/88 R

Primary Examiner—Charlie T. Moon
Assistant Examiner—Ronald S. Wallace
Attorney, Agent, or Firm—Richard L. Miller

[57] ABSTRACT

A method of fabricating a hand calculator utilizing die press punching to form its three parts. A circular stationary base plate is punched with a central, circular, raised, beveled portion which is then rigidly fixed to a circular stationary top plate by means of flared eyelets. Between these two parts a circular movable scale plate is movably inserted. The scale is etched with scales, and punched with a plurality of holes about its periphery to allow for pencil point movement.

4 Claims, 2 Drawing Figures

METHOD OF FABRICATING A HAND CALCULATOR

BACKGROUND OF THE INVENTION

Heretofore it has been known in the prior art that numerous calculating devices have been marketed. The majority of these calculating devices have been rather cumbersome and difficult to interpret as well as difficult to manipulate.

U.S. Pat. No. 169,941 makes reference to a design patent of a hand calculator of which no method of fabrication is notated.

Furthermore, U.S. Pat. No. 3,511,438 is an apparatus patent of a hand calculator of which no method of fabrication is notated.

A method of fabrication is presented which minimizes the difficulty in manipulating a hand calculator by providing a circular stationary base plate having a central, circular, raised, beveled portion which is rigidly fixed to a circular stationary top plate by means of flared eyelets. Between these two parts is a circular movable scale plate etched with scales, punched with a plurality of holes about its periphery to allow for pencil point movement and coated with lacquer. The lacquer combined with the beveling of the central, circular, raised potion and adherence to proper height tolerances afford remarkable ease in the hand calculator fabricated using this methodology.

SUMMARY OF THE INVENTION

An object is to reduce drag of the moving parts of a hand calculator while still not permitting the parts too move so easily as to have accidental inadvertent movement of the parts.

A further object is to provide a method of fabricating a hand calculator with ease of movement of the non-stationary parts.

The foregoing objects, features and advantages of the fabrication will, in part, be pointed out with particularity and will, in part, become obvious from the following more detailed description of the fabrication, which forms an integral part thereof.

BRIEF DESCRIPTION OF THE DRAWINGS

In the drawings.

In the various figures of the drawing, like reference characters designate like parts.

DESCRIPTION OF THE PREFERRED METHOD

Figure 1:
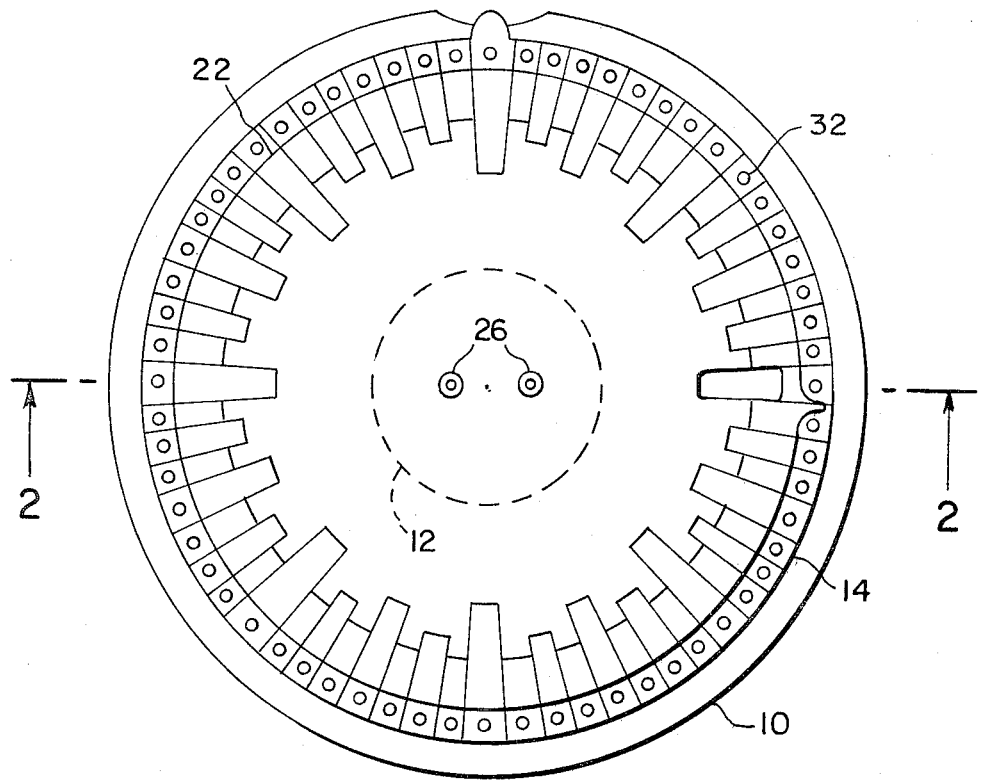
FIG. 1 is a plain view of the present invention.
Figure 2:
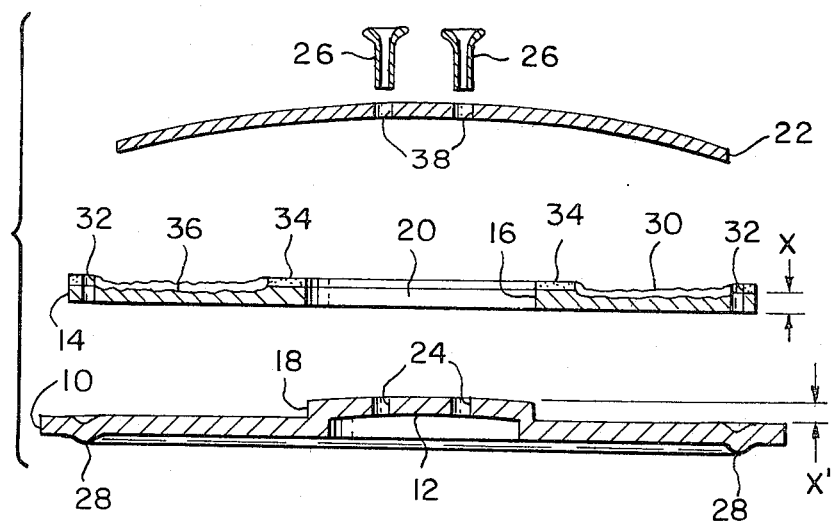
FIG. 2 is an exaggerated, exploded cross sectional view taken on line 2—2 of FIG. 1.

The method of fabricating a hand calculator can best be understood by referring to FIG. 2, which illustrates an exaggerated, exploded cross section showing the die punched circular stationary base plate 10 that contains a central, circular, raised, beveled portion 12 and a die punched circular dimple groove 28 that continuously surrounds its periphery. The dimple groove 28 acts as a runabout for a pencil point. The raised, beveled portion 12 of the circular, stationary base plate 10 has holes 24 formed in it to be used for later rigid assembly.

The die punched, circular, movable scale plate 14 must have a thickness 16 (indicated by X) that is within −4.0% tolerance of the height 18 (indicated by X') of the central, circular, raised, beveled portion 12 of the circular stationary base plate 10. The circular moveable scale plate 14 contains on its face 36 etched reference scales 30 used for interpretation purposes and a plurality of holes 32 about its periphery used for means of rotation and covered with a coating 34 such as lacquer that greatly improves the ease of motion. A central circular hole 20 die punched into the circular movable scale plate 14 fits over a central, circular, raised, beveled, portion 12 of the circular stationary base plate 10 to allow for complete revolving of the movable scale plate 14.

The die punched circular stationary top plate 22 has holes 38 formed in proper alignment with mating holes 24 formed in the circular, raised, beveled portion 12 of the circular stationary base plate 10 so that the aligned holes 24 and 38 form passage ways affording rigid attachment with flared eyelets 26 while permitting revolving of the circular movable scale plate 14.

The top plate is punched of flat material and is secured to the beveled portion while flat, it is the securement to this beveled portion 12 which causes top plate 22 to warp as shown greatly exaggerated in FIG. 2.

Although particular types of materials such as aluminum or stainless steel are desirable and are mentioned, it is understood that substitutions for these materials can also be utilized as long as they carry out the features of the fabrication.

I claim:

1. A method of fabricating a hand calculator, which comprises the steps of:
    (a) punching out on a press die a circular stationary base plate containing a central, circular, raised, portion having both an upper arcuately beveled surface and a stepped circular peripheral bearing edge;
    (b) punching out on a press die a circular moveable scale plate having a thickness within −4.0% tolerance of the height of the central, circular, raised, portion of said circular stationary baseplate and containing a central circular hole permitting its placing on top of said stationary base plate about said bearing edge while affording complete revolving about the same;
    (c) punching out on a press die a flat stationary top plate;
    (d) forming holes into a central portion of said circular stationary top plate and said circular stationary base plate allowing for proper alignment thereof; and
    (e) placing said moveable scale plate on top of said stationary base plate by allowing the raised, portion of said stationary base plate to enter the central circular hole of said moveable scale plate, then placing said flat circular stationary top plate on top of said arcuately beveled surface of said stationary base plate so that formed mating holes align, then conforming said top plate to said arcuately beveled surface of said base plate, and securing the conformed top plate to said arcuately beveled surface of said base plate by means of separate fasteners inserted through said aligned holes in said top plate and said base plate, such that the peripheral edge of said top plate is adjacent to said moveable scale plate while not inhibiting its revolving movement.

2. The method as defined by claim 1, further comprising forming a plurality of holes about the periphery of said circular movable plate, wherein said step of punching out on a press die a circular stationary base plate containing a central, circular, raised, beveled portion further contains the punching on a press die of a circular dimple groove continuously surrounding the periphery of said circular stationary base plate and aligned under said plurality of holes, whereby a pencil point or the like can be inserted into the holes with said groove forming a runabout for the pencil point.

3. The method as defined by claim 1, wherein said step of punching out on a press die a circular movable scale plate having a thickness with −4.0% tolerance of the height of the central, circular, raised, beveled portion of said circular stationary base plate and also containing a central circular hole permitting its placing on top of said stationary base plate while affording complete revolving about the same further contains etching of reference scales on the circular movable plate, and coating the entire surface of said movable plate after etching with a suitable finishing material.

4. The method as defined by claim 3 wherein said step of coating is carried out by spraying with lacquer.

* * * * *